June 9, 1953          G. MUFFLY          2,641,109

MULTITEMPERATURE REFRIGERATING SYSTEM

Filed Aug. 29, 1947          6 Sheets-Sheet 1

FIG. 1.

INVENTOR.
Glenn Muffly,
BY
Harness, Dickey & Pierce.
ATTORNEYS.

June 9, 1953  G. MUFFLY  2,641,109
MULTITEMPERATURE REFRIGERATING SYSTEM
Filed Aug. 29, 1947  6 Sheets-Sheet 2

FIG. 2.

INVENTOR.
Glenn Muffly.
BY
Harness, Dickey & Pierce
ATTORNEYS.

June 9, 1953 — G. MUFFLY — 2,641,109
MULTITEMPERATURE REFRIGERATING SYSTEM
Filed Aug. 29, 1947 — 6 Sheets-Sheet 5

FIG. 5.

INVENTOR.
Glenn Muffly.
BY Harness, Dickey & Pierce.
ATTORNEYS.

June 9, 1953  G. MUFFLY  2,641,109
MULTITEMPERATURE REFRIGERATING SYSTEM
Filed Aug. 29, 1947  6 Sheets-Sheet 6

INVENTOR.
Glenn Muffly.
BY
Harness, Dickey & Pierce.
ATTORNEYS.

Patented June 9, 1953

2,641,109

UNITED STATES PATENT OFFICE 2,641,109

MULTITEMPERATURE REFRIGERATING SYSTEM

Glenn Muffly, Springfield, Ohio

Application August 29, 1947, Serial No. 771,181

20 Claims. (Cl. 62—4)

This invention has to do with two-temperature refrigerators of the general class of those disclosed in my U. S. Patents Nos. 2,291,826, 2,349,367, 2,359,780, 2,375,319 and 2,425,634.

There is a demand for refrigerating systems of the two-temperature type for household refrigerators wherein one zone is cooled to a sub-freezing temperature suitable for the storage of frozen foods while another zone is cooled to a temperature slightly above the freezing point of water and held at a high relative humidity. In such refrigerators the warmer spaces have in the past been cooled by intermittently refrigerated surfaces, so dishes are sometimes colder than cooling surfaces and therefore collect an objectionable amount of dew. The colder zone should be constantly held far below the freezing point of water to avoid the thawing and refreezing which ruins frozen foods. Many of the present production models allow too much variation of freezer temperature.

In household electric refrigerators the trend has for some years been in the direction of adopting the so-called "capillary tube" as the expansion device because of its lower cost and because it has the characteristic of unloading the compressor during idle periods so that a motor of smaller size or cheaper type can be used.

Numerous attempts have been made to use capillary tubes in connection with two-temperature systems wherein the compressor operates on two different suction pressures, but most such attempts have failed because of failure to overcome an inherent characteristic of this type of liquid flow controlling device.

The term "capillary tube" is a misnomer and I prefer to refer to liquid control devices of this general type as "vapor-lock devices." This term is more descriptive because the small elongated passages of such devices operate on the vapor-lock principle and not on the capillary principle. A vapor-lock liquid control device properly proportioned for the system in which it is used is capable of passing refrigerant in liquid phase at a higher rate than it can be condensed in the system, but it is at the same time incapable of passing the same refrigerant in its vapor phase at a rate as high as that at which it is compressed.

Since a pound of refrigerant vapor has a much greater volume than a pound of the same refrigerant in its liquid phase whatever liquid refrigerant is collected in the high side of the system flows immediately to the low side of the system without allowing any appreciable amount of vapor to flow from the high side of the system to the low side of the system while the compressor is in operation. In a properly designed system using a vapor-lock liquid control device this condition of operation is maintained through rather wide variations of temperature and pressure in the system, notwithstanding the fact that vapor flows faster than liquid in feet per second.

An object of this invention is to further simplify the control apparatus for a two-temperature refrigerating system.

Another object is to provide in a two-zone refrigerator a tank of ice and water for cooling the warmer compartment and an evaporator located outside of the food storage space and insulated therefrom for freezing a portion of the water to form ice, thus insuring against the freezing of foods in the warmer space while the colder space is cooled to a subfreezing temperature.

A further object is to provide for employing all of the liquid refrigerant in the system in the colder evaporator during the portion of the time it is being actively refrigerated by action of the compressor and to divert a portion of the liquid refrigerant to the warmer evaporator during the active period of the warmer evaporator.

An additional object is to employ a portion of the colder evaporator as a secondary system while it is not being cooled by the compressor and to provide a cryohydrate to cool that portion of the evaporator which temporarily acts as a secondary condenser.

A further object is to combine the tank of an automatic ice maker of the flotation type with the liner of a high humidity compartment to prevent wall temperature fluctuations and thus avoid excess dew deposit on foods.

Still another object is to employ all of the refrigerant charge effectively when either evaporator is being cooled so that no part of the refrigerant charge is held in an inactive state.

An additional object is to provide for continuous refrigeration of the colder evaporator both during operation of the compressor and during idle periods of the compressor, while providing intermittent refrigeration of the warmer evaporator.

A further object is to provide simultaneous cooling of two evaporators at different evaporating temperatures while the compressor operates at the suction pressure of the warmer evaporator.

Still another object is to provide means for storage of heat in latent form as it is removed from a cold zone while the compressor is idle, effecting heat transfer from the zone being cooled to the latent heat storage means by the evaporation and condensation of a volatile refrigerant at one pressure circulated by gravity alone.

An additional object is to use the same vapor-lock restrictor for controlling liquid flow to a plurality of evaporators cooling a multi-zone refrigerator.

My invention may be applied through the use of various structures, each providing a part or all of the advantages as outlined by the objects recited above. Typical arrangements are as follows:

A. The evaporator which cools the warmer zone of the refrigerator (commonly spoken of as the main food space) may be provided with a header and this header equipped with valves actuated by pressure or temperature changes so that when the warmer evaporator has been cooled to the desired cut-out temperature the valves are actuated to cause the header to become a part of the colder evaporator, which thereupon acts to cool the freezer or colder food space of the refrigerator. The pressure and temperature of the header then drop to a lower cut-out point at which a switch is opened to stop operation of the condensing unit. The unit is restarted by a rise of the temperature-pressure condition.

The switch means for starting and stopping the condensing unit may respond to the temperature rise of either evaporator and the valves which connect the header with one or the other evaporator may be electrically actuated by the circuit closed when one of the evaporators rises to its starting temperature. This arrangement provides for starting in response to the temperature rise of either evaporator and for favoring one of them when both call for cooling at the same time. The evaporator not so favored or both evaporators may be provided with latent heat holdover means such as a tank of eutectic freezing solution for the freezer and a tank of water and ice for the warmer evaporator, the liquid in such tank being frozen during operation of its respective evaporator and partially melted during idle periods of its evaporator. The colder holdover tank assures that the temperature of the freezer does not rise too high during idle periods and the icewater holdover assures that the warmer space is not cooled to too low a temperature during operation of the condensing unit.

B. With the water and eutectic tanks it is permissible to omit the valves and let the condensing unit cool the liquid in both tanks simultaneously since the eutectic assures that the freezer temperature does not rise too high and the water assures that the warmer food space is not cooled below 32° F.

C. With the ice-water tank cooling the warmer space and protecting it from freezing it is permissible to use a single evaporator both for cooling the freezer and forming the ice in the ice-water tank to cool the warmer space. This arrangement is more conveniently made when the freezer is locatd below the main food space, thus confining the volatile refrigerant to the freezer vaporator when the condensing unit is idle and allowing ice to float upwardly during such idle periods to cool the main food space. This arrangement is also a convenient one for making the system removable from the cabinet.

D. The arrangement A, B or C may use the control means of one of the other arrangements and the valves for switching evaporators may be included or omitted.

Further combinations of the basic arrangements described above will be suggested by and/or will be apparent to those skilled in the art from the description which follows.

For the purpose of illustration herein only the arrangements of A, B and C are shown in the drawings and described in detail. In the drawings.

Figure 1:
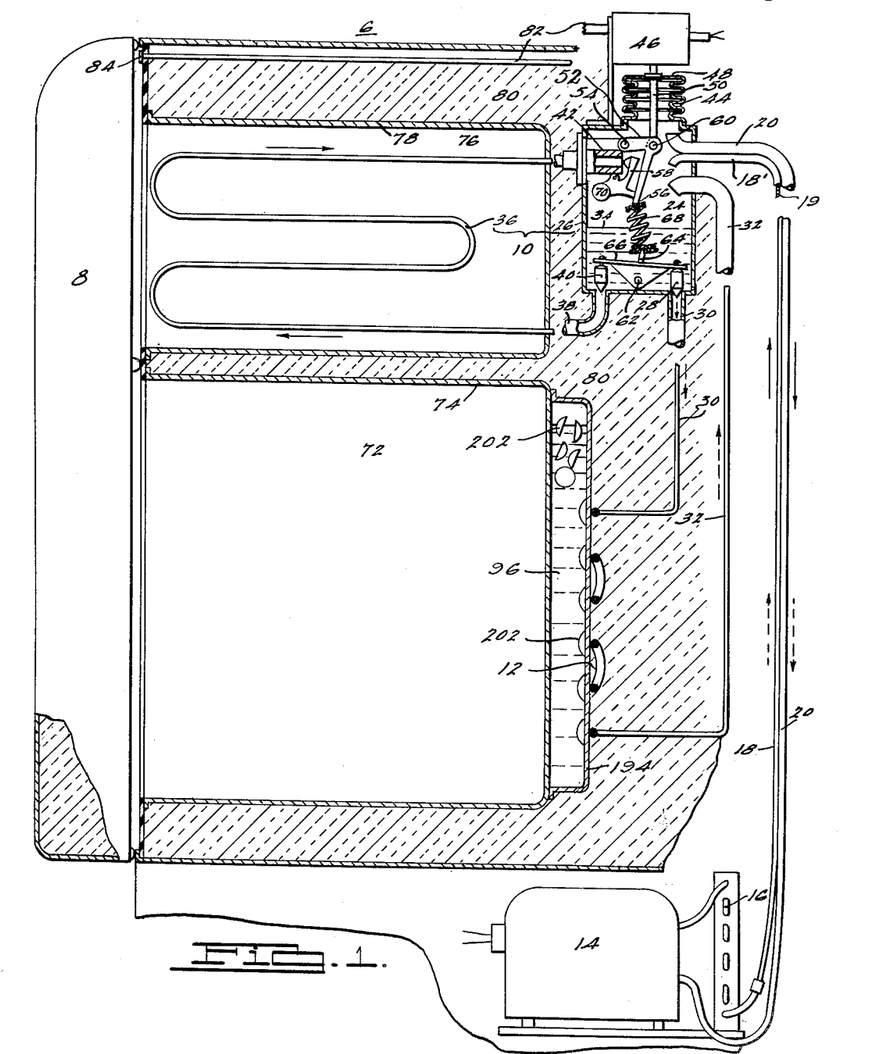
Figure 1 is a partly diagrammatic view of a refrigerating system and a portion of the cabinet cooled thereby. The control shown in enlarged section acts in response to changes of vapor pressure. This corresponds to the arrangement "A" mentioned above.

Referring to Figure 1, it will be seen that the cabinet 6 has an insulated door 8 and is equipped with a refrigerating system including two evaporators 10 and 12 connected with the motor-compressor unit 14, which delivers compressed refrigerant vapor to the condenser 16 from which liquid refrigerant flows through the tube 18 which has a portion 18' restricted by insert 19 and its non-restricted portion is arranged in heat exchange with the suction tube 20. The portion 18' of tube 18 may either be of small bore or restricted by an insert so as to act as a vapor-lock device. The tubes 18 and 20 may be extruded in one piece, soldered together or otherwise brought into heat exchange relationship at a portion of 18 in which liquid refrigerant is under substantially its high side pressure.

The restricted section 18' of tube 18 delivers liquid refrigerant into the chamber 24 of header 26 of evaporator 10. While this header is also connected with the lower evaporator 12, which operates at a higher temperature, it will be noted that in the position shown the valve 28 closes the inlet to the tube 30 leading downwardly to the warmer evaporator 12, thus only vapor is present in the warmer evaporator, which is connected at its outlet with the chamber 24 by means of the return tube 32. The operation as indicated by solid arrows in Figure 1 is thus effective to cool the colder evaporator 10 only. The level of liquid refrigerant within the chamber 24 is indicated at 34, this head of liquid being sufficient to balance the liquid head within the coil 36, which may be arranged like 136 of Figure 2. Liquid flows from the chamber 24 through the tube 38, the valve 40 being lifted from its seat, while liquid and vaporized refrigerant return to the chamber 24 through the fitting 42, the outlet of which is open as shown in Figure 1.

This operation of the colder evaporator 10 is exactly as if the warmer evaporator 12 did not exist. The small amount of vapor contained in the inactive warmer evaporator 12 and in the tubes 30 and 32 may be disregarded, as this amount of refrigerant could be added to or subtracted from the charge used in refrigerating the colder evaporator 10 without producing any detectable effect.

As the temperature of the colder evaporator 10 is lowered by operation of the system, the pressure within the chamber 24 will decrease so that the bellows 44 contracts under the combined effects of atmospheric pressure and a spring within the switch mechanism 46. As the head 48 of the bellows moves downward, carrying with it the rod 50, it moves the bell crank 52 about its pivot 54. This carries the point 56 farther to the left and tilts the valve 58 slightly in the direction of greater opening. These movements of parts within the chamber 24 produces no effect upon the operation of the system, but at a set limit of downward movement of the bellows head 48 the mechanism of the switch 46 is operated to open the electrical circuit which has been supplying current to the motor of the motor-compressor unit 14, thus the compressor ceases operation with the valves in the positions shown in Figure 1.

During this idle period the vapor pressure within the colder evaporator 10 including chamber 24 will rise and the first effect produced thereby will be the upward movement of the head 48 of the bellows 44, carrying with it the rod 50 and the pin 69 by means of which this rod is connected with the bell crank 52. This causes the point 56 to move to the right, allowing the valve rocker 58 to move slightly in the direction of closing the outlet end of the tube 42. This movement continues until the point 56 passes the center line formed by the pivot 62 and the point 64 of the rocker 66 which carries the valves 28 and 40. When this center line has been definitely passed, the spring 68, which is compressed between points 56 and 64, will cause the rocker 66 to tilt to the left upon its pivot 62, opening the valve 28 and closing valve 40. In the meantime the valve 58, which has been slowly closing, will complete its closure coincidentally with the tilting of the rocker 66 to the left.

The above described operational movements of the valves within the chamber 24 will all have taken place during an upward movement of the bellows head 48 which is less than enough to have reclosed the switch 46. The system is still idle but the chamber 24 is now shut off from the evaporator coil 36 and a path has been opened through the tube 30 for liquid refrigerant to flow from the chamber 24 of evaporator 10 to the evaporator 12. The chamber 24 will now be drained of liquid refrigerant, since the amount contained therein during its operation as part of the evaporator 10 is only enough to fill the evaporator 12 with its normal operating charge. The chamber 24 now assumes the vapor pressure of the warmer evaporator 12 and the bellows 44 is further expanded by this pressure. If the system has not previously been in operation, the evaporator 12 will no doubt be warm enough to cause the bellows 44 to expand to the cut-in point of the switch 46 at once, but in the event that the system has been in operation for some time and the evaporator 12 thus precooled, the expansion of the bellows 44 in response to the vapor pressure of the evaporator 12 may not be sufficient to close the switch immediately.

There will be some cooling of evaporator 12 by the cold liquid from chamber 24 and a slight further cooling due to 26 acting as a secondary condenser until the pressure-temperature relationship of 12 and 26 reaches equilibrium.

After this slight cooling of evaporator 12, which may occur with the compressor idle, the evaporator 12 will warm up again and the pressure within it and within the chamber 24 will rise to some preselected pressure at which the expansion of the bellows 44 will be sufficient to cause the switch 46 to reclose and thus start operation of the motor compressor unit.

When the compressor restarts, the circulating path will be as indicated by broken arrows, whereas its previous path is indicated by solid arrows. The coil 36 of the colder evaporator receives no liquid refrigerant from the chamber 24 because the valve 40 is closed and the liquid is being drained from the chamber 24 through the tube 30. Vapor cannot escape from the coil 36 into the chamber 24 through 42 because the valve 58 is closed and the higher pressure within the chamber 24 adds effect to the counterweight 70 which urges the valve 58 against its seat. In like manner the higher pressure within the chamber 24 aids the spring 68 in holding the valve 40 against its seat so that liquid can not flow through connection 38.

As the warmer evaporator 12 is cooled, its suction pressure drops, allowing the bellows 44 to contract. The effect of this contraction to the cut-out pressure of evaporator 12 is the movement of the point 56 to the left, causing the spring 68 to be carried past center again and the valve rocker 66 to snap back to the position shown in Figure 1. At the instant of this snapping over center the spring 68 is allowed to extend and this reduces the spring resistance to the downward movement of the rocker 52 which is urged in that direction by the downward thrust of switch 46 on the rod 50. The resulting over-travel of the rocker 52 is designed to be sufficient to make contact with the valve rocker 58 and reopen the outlet port of the tube 42. Refrigerant is now free to flow from the chamber 24 through the tube 38 and the coil 36, returning through the fitting 42 to the header chamber 24. Since no more liquid is allowed to flow downwardly through the tube 30, all liquid refrigerant delivered to the chamber 24 through the tube 18 and its restricted portion 18' is now diverted into the coil 36 of the colder evaporator. Since the pressure within the colder evaporator 10 is considerably lower than that of the warmer evaporator, the pressure within the suction tube 20 and the chamber 24 will be sharply reduced by the operation of valves to reassume the positions shown in Figure 1. This will hasten the evaporation of any liquid remaining in the warmer evaporator 12 and prevent any vapor from recondensing in the warmer evaporator while the colder evaporator is in operation. As soon as the warmer evaporator 12 is emptied of liquid refrigerant, the operation of the system will proceed as first explained, cooling only the colder evaporator including its header 24 until the evaporating pressure drops to the cut-out point of switch 46, whereupon the motor-compressor unit 14 stops.

Figure 2:
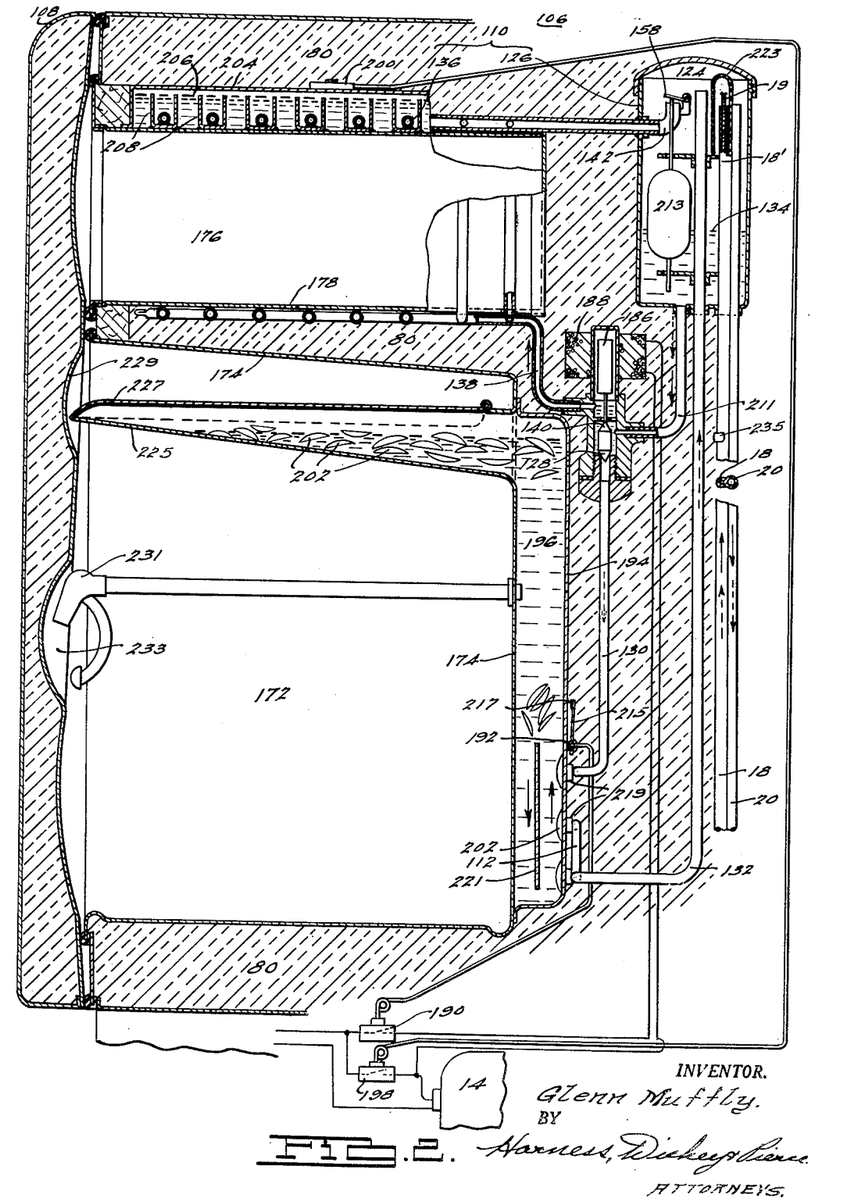
Figure 2 is a similar view showing the warmer evaporator arranged to operate an automatic ice maker which indirectly cools the non-freezing space. The other evaporator freezes a body of eutectic solution while acted upon by the compressor and acts as a secondary system during periods when the compressor is not cooling the freezer. Controls respond to temperature. This corresponds to the arrangement "A" mentioned above.

The compartment 72 is indirectly cooled by evaporator 12 and freezing compartment 76 has a liner 78 and is cooled by coil 36 which may be inside of the compartment, located between the liner and the insulation 80, or arranged as in Figure 2.

The switch 46 is preferably adjustable and this adjustment, represented by the rod 82 and the knob 84, may be employed to modify the tension of a spring within the switch 46 or to move a member of the switch positively in the direction of opening or closing. Such manual adjustments of switches are common and hence need not be shown here in detail but it will be understood that the rod 82 may either be rotated or pushed and pulled or both for the purpose of adjustment or to actuate the switch and, through the medium of the rod 50, the valves within the chamber 24. This allows the user to start or stop operation of either evaporator.

The switch 46 is, of course, connected in series between one side of the electric power supply line and one pole of the motor within the unit 14, the other pole of the motor being connected with the other side of the line so that the motor operates while the switch is closed.

Evaporator 12 contacts tank 96 containing water which is frozen thereby. The ice-water in tank 96 cools liner 74, thus cooling space 72 while insuring against the freezing of foods stored therein.

Figure 1 may have the faucet, float valve and ice delivery chute on the order of Figures 2, 3, 4, 5 and 6 though these parts do not appear in the section shown in Figure 1.

The header 26 is described as a part of evaporator 10 since evaporation takes place in chamber 24 as well as in the coil 36 while the compressor is active in cooling evaporator 10. During this portion of the cycle there is active evaporation in chamber 24 to cool the incoming liquid. Vapor from 24 flows directly into suction tube 20. While liquid refrigerant does not collect in chamber 24 when valve 28 is open and coil 12 active there will also be considerable liquid evaporated in 24 to form "flash gas" which goes directly to the suction tube 20. This evaporation in 24 cools the liquid which flows through tube 30 to the coil 12, hence is useful in cooling evaporator coil 12.

Referring to Figure 2, which shows a modified form of the refrigerant control system, it will be seen that equivalent parts which are somewhat modified bear reference numbers similar to those of Figure 1 but 100 higher. The colder evaporator 110 of Figure 2 corresponding to evaporator 10 of Figure 1, the warmer evaporator 112 corresponding to evaporator 12 of Figure 1 etc. The chamber 124 of vertical header 126 forms a part of evaporator 110. Liquid valve 128 controls the inlet to tube 130 leading to evaporator 112 from which vapor returns through tube 132 to chamber 124 while evaporator 112 is operating. The liquid level 134 in chamber 124 is the one prevailing while evaporator 110 is operating. When the colder evaporator 110 is in operation liquid which does not evaporate in chamber 124 evaporates in coil 136 to which it flows through tube 138, valve 140 being open and valve 128 closed. Vapor from coil 136 returns through fitting 142 to the chamber 124. The outlet from 142 to chamber 124 is fitted with a check valve 158 which, like 58 of Figure 1, is held open while the colder evaporator 110 is in operation. The main food compartment 172 of the refrigerator seen in Figure 2 is fitted with a liner 174 and the frozen food compartment 176 has a liner 178. The insulation 80 surrounds these liners on five sides as in Figure 1.

The motor-compressor unit 14, condenser 16, liquid tube 18, its insert 19 and suction tube 20 are the same as in Figure 1. The tubes 18 and 20 are in heat exchange with each other and may be extruded in one piece as indicated in Figure 2. A portion of tube 18 near its outlet (upper) end has a restricting device 19 which may be in the form of a tightly coiled wire spring or two wires twisted together. This restricting device causes the section 18' of the tube 18 to act as a vapor-lock device, allowing liquid to flow at a rate equal to the maximum condensing rate of 14 and 16 but preventing the flow of refrigerant vapor at a rate equal to the minimum condensing capacity of 14 and 16.

The operation of the system seen in Figure 2 is substantially the same as that of Figure 1 except that the valves 128 and 140 are formed in one piece and actuated by the armature 186 of solenoid 188 instead of being actuated by the vapor pressure of the refrigerant. This solenoid is under control of thermostatic switch 190 which has its bulb 192 adjustably held in contact with the rear wall 194 of ice maker tank 196, the opposite wall of the tank being formed by the liner 174. This switch 190 also serves to close the circuit through the motor of unit 14 which is connected in series with solenoid 188. Assuming that switch 198 remains open, the full current drawn by the motor of 14 flows through solenoid 188, such full current being ample to lift the armature 186.

The motor of 14 may alternatively be energized by the closing of switch 198 in response to a rise of temperature of bulb 200, which is located in heat exchange relationship with the frozen food compartment 176, as will be more fully explained hereinafter. As shown in Figure 2 both of these switches 190 and 198 are open, hence the motor-compressor unit 14 is idle and the solenoid 188 is not energized, thus valve 128 is closed and valve 140 is open. The system has recently been in operation as indicated by the fact that ice discs 202, which have been formed on the wall 194, are still attached thereto. Since control bulb 192 is located adjacent to one of these ice discs, though on the opposite side of wall 194, this bulb is at a temperature not far from 32° F. and below the temperature required to close the switch 190. Likewise the switch 198 remains open because the bulb 200 is colder than its cut-in point, which may be about 10° F. The bulb 200 is for convenience shown as contacting the top wall of the tank 204, which is nearly filled with a freezable solution 206, preferably an eutectic solution so that it has a narrow range of freezing and melting temperatures. This liquid, which has previously been frozen by evaporation of refrigerant within the coil 136, is during the idle period of evaporator 110 gradually melting due to heat infiltration through the insulation 80 and heat reaching it through the walls of the freezer 176.

While the entire coil 136 acts as a portion of evaporator 110 during the period when the condensing unit is cooling it, we are now concerned with the action of coil 136 while the condensing unit is idle or at least is not active in cooling the coil 136. As shown in Figure 2, the liquid refrigerant level in chamber 124 is indicated by 134 and the same level will prevail in the balance of the evaporator 110, namely in the coil 136, except that there will be some evaporation of refrigerant in the bottom and side legs of coil 136. The vapor thus formed will condense in the upper horizontal portion of the coil 136 because of the cooling effect of the frozen eutectic solution 206 acting directly on the tubing and on the fins 208 which are thermally associated with the coil 136. Liquid condensing in the upper portion of the coil 136 will flow by gravity into the side and lower portions where it evaporates to cool the chamber 176. The quantity of eutectic solution 206 in the tank 204 is such that the frozen food compartment 176 will be properly cooled for several hours without operation of the motor-compressor unit. The eutectic (freezing and melting) temperature of the solution 206 is quite low, say on the order of 0° F., with very little change of temperature between its fully frozen and fully melted condition. When this material has melted to a slight degree or the lining 178 of freezer 176 has warmed up to say 10° F., the bulb 200 will rise to the temperature at which it causes the switch 198 to close. This temperature may also be approximately 10° F. as heat reaches the bulb 200 by conductivity from the liner 178 and also by heat leakage through the insulation 80. The bulb 200 is preferably located on a side wall of the tank 204 instead of on the top as shown and the switch 198 is adjusted to open after all of the eutectic solution has been frozen and to close before any great part of it has melted, thus all of the eutectic solution is frozen at the end of an operating period of evaporator 110 and only a small part of it melts before the next cooling cycle of evaporator 110 under action of the motor compressor unit 14. During idle periods of the unit 14 and during periods when the unit 14 is active in cooling evaporator 112, the eutectic solution serves to cool the compartment 176 through the medium of the evaporative refrigerant then trapped in evaporator 110 or in coil 136 of that evaporator.

Assuming now that the compartment 176 has warmed up and bulb 200 risen to the cut-in point of switch 198, the motor-compressor unit 14 is thereby energized and refrigerant vapor is withdrawn from the header 126 of evaporator 110 through the tube 20. When this vapor is condensed the liquid thus formed returns through tube 18 under high pressure in heat exchange with the suction tube 20 and is then reduced in pressure by the restricting insert 19 in section 18' of the tube 18. This partly precooled liquid then discharges into the chamber 124 of header 126 where it is further cooled by its own evaporation, the flash gas returning at once through tube 20 to the compressor and the liquid filling the chamber 124 to a level such as indicated by 134. This liquid is free to flow through the tube 211, past the open valve 140 and through the tube 138 to the coil 136, which is here shown as having upper and lower headers. Valve 140 is open because the solenoid 188 is not energized and the valve 158 is open because float 213 is lifted by the liquid refrigerant in chamber 124. This operation of evaporator 110, cooling space 176 and the eutectic 206, will continue until switch 198 is reopened by the cooling of bulb 200 to its cut-out temperature which may be in the neighborhood of 0° F.

Now, assume that the ice discs 202 have melted free from the tank wall 194 and floated upwardly in tank 196. Also assume that a considerable quantity of ice has been removed from the tank so that the new ice floats up to a level considerably above that of bulb 192. The bulb 192 warms up due to the fact there is no longer any ice in its vicinity and the fact that the denser water in the bottom of the tank is warmer than 32°, the maximum density point of water being 39.2° F. The temperature of bulb 192 required to reclose the switch 190 may be in the neighborhood of 36° F. and the cut-out temperature 32° or lower according to the position of the bulb 192 relative to the area covered by one of the ice discs 202. The bulb 192 is pressed against the wall 194 by the spring 215, which is attached to a movable arm seen in section at 217. This arm may be connected with external manual means for adjusting its position in a plane parallel with the wall 194 so as to regulate the distance between the bulb 192 and the adjacent one of the buttons 219. These buttons are small discs of metal attached to the evaporator coil 112 and making contact with the sheet metal wall 194.

This arrangement of the control bulb adjustably located on a tank wall adjacent to one of the contact areas of the ice maker evaporator is similar to arrangements shown in some of my own earlier patent applications, but a new form of ice maker tank is shown here and within this tank is the baffle 221 which aids in the production of clear ice. When small pieces of ice are frozen on a tank wall in the manner shown, the ice is clear if frozen very slowly or if water is circulated over the freezing ice at a rate rapid enough to remove air bubbles from the newly formed ice surface. With the ice maker evaporator operating at an intermediate temperature, not too far below the freezing point of water, it is possible to produce sufficient water circulation by its own change of density to produce satisfactorily clear ice. The water in the passage between the baffle 221 and the wall 194 will be cooled during operation of the evaporator 112, the part of this water contacting the ice discs in process of formation reaching 32° F. so that the average temperature of the water between the baffle 221 and the wall 194 will be considerably lower than the average temperature of the water between the baffle and the liner 174. Due to the temperatures of this water being within the reverse thermal expansion range, that is between 32° and 39.2° F., its thermal circulation will be in reverse of that commonly found in liquids. The warmer water, approaching 40° F. in temperature, will flow downwardly due to its greater density and the colder water, approaching 32° F., will flow upwardly over the ice discs.

When the bulb 192 rises to a temperature which indicates that newly formed ice discs have melted free from the tank wall and floated upward well beyond the level of the bulb 192, the switch 190 closes. This switch is shown as being connected in series with the solenoid 188 and the motor-compressor unit 14 so that its closing energizes both the solenoid and the motor in the event that switch 198 is open. Should switch 198 remain closed until after switch 190 closes, the main flow of current will be through the switch 198 so that not enough current flows through the solenoid 188 to actuate its armature 186. This effect is obtained with the wiring diagram shown in Figure 2 by virtue of the slightly greater resistance of that branch of the circuit which includes the switch 190 and the winding 188. Thus the closing of switch 190 prior to the opening of switch 198 will not affect the operation of the system which will continue to cool the evaporator 110 including the freezer coil 136. When the freezer and its eutectic tank have been pulled down to the cut-out temperature of bulb 200, the switch 198 will open, whereupon all of the current supplied to the motor of unit 14 will flow through the coil 188. This increase of current flow through the solenoid coil 188 will lift the armature 186, opening the valve 128 and closing the valve 140, just as would have happened immediately upon closing of the switch 190 if the switch 198 had been open at that time. The wiring diagram shown calls for the full motor current flowing through the coil 188 when only switch 190 is closed and less than half of the current when both switches are closed, but it will be understood the coil 188 may be in parallel with the motor of unit 14 and its circuit controlled by a relay switch instead of being connected in series with the motor of 14. There are various well known devices which may be used for the purpose of actuating the armature 186 in response to the closing of one of the thermostatic switches and such actuation may be independent of or dependent upon the position of the other switch, thus giving preference to either of the two evaporators which may be considered more important. In Figure 2, I have shown the wiring diagram and valve mechanism arranged to give preference to the evaporator 110, but it will be obvious that the same apparatus could be connected so as to give preference to the evaporator 112 when both evaporators call for refrigeration and both switches are closed.

Continuing the cycle of operation which starts with the actuation of the armature 186, it will be seen that the closing of the valve 140 stops the flow of liquid refrigerant through the tube 138 and the opening of valve 128 starts the flow of liquid refrigerant downwardly through the tube 130, draining liquid refrigerant from the chamber 124 into evaporator coil 112. Since this coil has been idle and its normal operating temperature range is warmer than that of evaporator 110 the evaporating pressure will immediately rise to a new level. Since the volume of liquid in chamber 124 is only enough to operate coil 112 this liquid starts draining into coil 112, which causes the float 213 to drop slightly to close valve 158 so that the higher pressure vapor which now fills the chamber 124 cannot flow into the connection 142. The valve 158 would operate without the aid of the float 213, but the float or the mechanism of Figure 1 eliminates the slight restriction to vapor flow due to the pressure that would be required to lift the valve.

Now that evaporator 112 has started operation, vapor will flow from it through the tube 132 to the top of space 124. Suction vapor will leave chamber 124 through the tube 20 and liquid refrigerant will be supplied to the chamber 124 through the tube 18, vapor being held back by the restricting insert 19. The tubes 132 and 20 may be so arranged within chamber 124 that no liquid flowing into this chamber through the tube 18 or tube 132 can pass directly into the inlet of tube 20. For this purpose, I have shown a cap or thimble 223 over the outlet end of tube 18 and located between the tubes 132 and 20.

During operation of the ice maker evaporator 112, the chamber 124 will run substantially dry except for liquid on its way from the outlet of tube 18 to the inlet of tube 211 and the pressure will be materially higher than when this chamber was operating as a part of the colder evaporator 110. This pressure will aid in holding valves 140 and 158 closed so that the proper amount of refrigerant is retained in that part of the system now connected with the active evaporator 112 and at the same time the correct charge of refrigerant for operation of the coil 136 as a secondary system will be maintained therein, continuing refrigeration of the freezer while the vaporized refrigerant is condensed in the top of coil 136 by the eutectic frozen solution (spoken of as a cryohydrate when frozen). All of the refrigerant is in active use at all times:

(a) The entire charge is utilized in cooling the evaporator 110 when the condensing unit is operating to cool the freezer.

(b) When the condensing unit is idle the entire charge of refrigerant is utilized in the operation of the evaporator 110 as a secondary system, vapor flowing through the fitting 142 to the chamber 124 and liquid returning from this chamber to the coil 136.

(c) When the condensing unit is actively cooling the warmer evaporator 112, employing less than the total charge of refrigerant for that purpose, the balance of the refrigerant charge is active in cooling the coil 136, which now operates as a secondary system with that part of it in heat exchange with the eutectic solution 206 serving as the secondary condenser and the balance of coil 136 serving as the secondary evaporator.

The ice-water tank 196 preferably covers the entire rear wall of the liner 174 up to a level above that of the water seen in the spout portion 225. This spout portion is considerably narrower than the liner 174 and is still narrower at its forward end. The hinged cover 227 allows access to the floating ice and the pocket 229 in the lining of the refrigerator door provides clearance for this spout so as to make the floating ice easily accessible. The liner 174 continues above the spout and its cover. It will thus be seen that the ice delivery spout or chute, which may be only a couple inches wide at the front, is the only obstruction within the main food space 172 while the bulk of the ice and water is stored between the liner 174 and the insulated rear wall of the cabinet. The faucet 231 is preferably located just below a shelf so that it occupies a negligible amount of space. The pocket 233 in the door allows the faucet 231 to project forward of the shelves so that it is accessible without disturbing any of the food in the cabinet.

The restricting insert 19 is shown in Figure 2 as being formed of wires twisted together with these wires slightly diverging at the top, which will prevent the insert 19 from sliding down from its proper position in the tube 18. Another method of retaining the insert 19 is indicated at 235 in Figure 2. The tube 18 is distorted by pressure so as to close its bore enough to stop the insert 19 but not enough to offer an objectionable restriction to the flow of liquid refrigerant.

While only the vapor lock or "capillary" type of refrigerant control device is shown in the appended drawings, I wish to make it clear that other types of refrigerant flow controlling devices can be used. For instance a high-side float valve will perform in the same way as the vapor lock device except that it does not provide for equalizing pressures to relieve the compressor of its starting load. A high-side float valve stops flow when practically all of the liquid has drained from the high-side. A vapor lock device greatly reduces the rate of flow in grams of refrigerant per second when vapor starts entering the restricted passage. The high-side float valve is a vapor stopping device in that flow stops before vapor starts flowing to the low side. The vapor lock type of device which includes orifices, labyrinths, and elongated passages of small cross section such as the so-called "capillary tubes" is a vapor restricting device rather than a liquid restricting device since it will allow liquid to flow at a higher rate but restricts vapor to a lower rate of flow than it can be condensed by the system in which the device is used. These devices do not function because of any pressure responsive action. It is true that the rate of liquid flow through a vapor lock device is higher when the pressure difference between inlet and outlet is greater, but if this were the principle upon which it functions the operation would be in reverse of that required. When the high-side pressure goes up, as in a hot room, the refrigerating capacity of the system drops because the compressor does not move as many pounds of refrigerant per hour. Under this condition the rate at which liquid collects in the condenser is reduced and consequently the rate at which liquid is supplied to the evaporator is correspondingly reduced.

It is true that if the condenser supplied an unlimited quantity of liquid to the vapor lock restrictor the rate of liquid flow would increase with an increase of pressure difference between inlet and outlet of the vapor lock device, merely because no vapor is allowed to reach the vapor lock device and consequently there is no vapor lock effect to control the rate of flow.

It will be understood that the term "vapor hold-back device" refers to a vapor lock restrictor, a high-side float valve or any device which regulates the flow of refrigerant in accordance with variations in the amount of liquid present at the entrance to the controlled port or passage and that the term "refrigerant flow controlling device" applies to any kind of apparatus located between the condenser and the evaporator of a refrigerating system to control the flow of refrigerant, whether this control is responsive to a condition of the liquid or to a condition of the vapor and whether the response is to a high-side condition or to a low-side condition. Such devices may also be referred to generally as "expansion devices," this term having been made correct by common usage.

In this and in co-pending applications, I have disclosed means for using one vapor lock restrictor for each of two evaporators operating at quite different temperatures and without any modification in the length, cross sectional area or condition of operation of the vapor lock restrictor. It works properly at 0° and at 35° F. evaporating temperature and over a considerable range of high-side pressures, for the reason that its rate of flow changes in a much larger ratio dependent upon the presence or absence of vapor at its entrance than it does in response to the usual changes in the pressure difference between its inlet and outlet.

A high-side float valve provided with a constantly open by-pass of a capacity too small to pass liquid at the rate it is being evaporated in the system would operate substantially the same as a properly proportioned vapor lock restrictor. Either one allows liquid to flow from the high side to the low side at the rate of its condensation and allows high-side and low-side pressures to substantially equalize when the compressor is idle. These devices respond to high-side conditions rather than low-side conditions, whereas low-side float valves and thermostatic or pressure actuated expansion valves respond mainly to variations in low-side conditions. The first group of devices functions to hold back on flow so as to build up a pressure in the condenser. The second group accomplishes an equivalent result by regulating the admission of liquid to the low side, assuming an over-supply of liquid to be available in the high side to meet all demands of the low side. These devices could be defined as one-group responsive to high-side influence and another group responsive to low-side influence.

In this specification, I have referred to the occasional use of evaporator section 136 as a secondary system. This term is commonly used with reference to a system consisting of an evaporator and a condenser in constant open communication with each other and operating at one pressure throughout. Some means is provided for cooling the part of the system which is to serve as the condenser, this part being cooled to a temperature below that at which liquid refrigerant evaporates in the portion of the system which acts as the evaporator. In Figure 2, the means employed for cooling that part of the coil 136 which acts as the condenser when the coil 136 is acting as a secondary system is the cryohydrate (frozen eutectic solution) 206. While the coil 136 is acting as a primary evaporator with liquid supplied from and vapor returned to the condensing unit which comprises parts 14 and 16, it is not only cooling the chamber 176 but is freezing the eutectic solution 206 so that this frozen eutectic or cryohydrate is available as the means for cooling that portion of the coil 136 which is to serve as the secondary condenser when this coil is shut off from the condensing unit or the condensing unit is idle.

It will be seen that the refrigerant within the coil 136 is always active but evaporation occurs in only the vertical legs and the lower horizontal legs of the coil while it is acting as a secondary system with condensation occurring in the top hroizontal legs. The entire coil 136 acts as an evaporator when it operates under the action of the pressure imposing element.

Assuming that the amount of liquid available for operation of the warmer evaporator is more than sufficient for it, any excess liquid will flow through the tube 32 or 132 into the chamber 24 or 124 and recirculate therefrom to the warmer evaporator. In this event there will be a liquid level in the chamber 24 or 124 during operation of the warmer evaporator, but this liquid level will be considerably lower than that maintained during operation of the colder evaporator 10 or 110 while the warmer evaporator is idle.

It will be obvious that the system herein disclosed is operable with a pressure imposing element of the absorption or adsorption type as well as with a mechanical compressor, the novel features being mainly confined to what is known as the "low side" of the system, that is the portion of the system operating at relatively low pressures and temperatures.

While the colder evaporator 10 or 110 is active, the chamber 24 or 124 may collect a slight excess of oil in the refrigerant, but upon starting of the warmer evaporator 12 or 112 this oil flows into the warmer evaporator along with the liquid refrigerant and due to the higher evaporating temperature and denser suction vapor is more readily returned through the suction. With certain kinds of oil and refrigerant it may be advisable to provide a small oil drain passage from the warmer evaporator directly to the suction tube 20.

The thermostatic switch 190 of Figure 2 responding to temperature changes of the bulb 192 will regulate the making of ice in the tank 196 so that more ice will be made whenever there is no ice attached on the wall 194 and the lowermost pieces of ice floating in the tank 196 or at a level somewhat above the bulb 192. This assures that the ice supply will build up to a predetermined extent after a portion of the ice has been removed or has melted. The insulation surrounding the frozen food chamber 176, the latent heat absorbing capacity of the freezing solution 206 and/or the specific heat capacity of the materials surrounding the chamber 176 and of the products stored therein will assure maintenance of the chamber 176 within a temperature range well below the freezing point of water during any normal idle periods of the refrigerating system thus controlled.

It will thus be seen that the motor-compressor unit 14 may be controlled by the single thermostatic switch 190 connected directly with the motor of 14, as is the switch 198 in Figure 2 but with its bulb located at 192. This would allow the liquid valve mechanism to be omitted with refrigerant flowing directly from restrictor 18' through tube 138 to the evaporator 136 and therefrom through tubes 142 and 130 to the evaporator 112.

The chamber 172 cannot be cooled to any temperature below the freezing point of water because heat flows from it to the ice and water contained in the tank 196 and to that portion of the liner 174 which is nearest to the space 176. Since these surfaces are at or above 32° F. and they are the only surfaces cooling air within the chamber 172 no part of this air can contact any surface which is colder than 32° F. As a considerable part of the liner 174 is held at substantially 32° F. by the ice and the water in which it floats the air within space 172 will be held within only a few degrees above 32° F. With the valves omitted and a refrigerant charge sufficient only for cooling the evaporator 136 when this evaporator is at its maximum temperature, somewhat colder than 32° F., there will be very little cooling of the evaporator 112 when the condensing unit starts an operating cycle, but as the evaporator 136 drops to lower temperatures the rate of evaporation therein will be so reduced that an increasing portion of the liquid refrigerant will flow through to the evaporator 112 before evaporating. This is the familiar tendency to "frost back" which can be observed on any evaporator fed with liquid refrigerant through any type of pressure reducing device except one which is specially designed, as is a thermostatic expansion valve responding to changes of temperature at the outlet of an evaporator, to prevent this.

It is thus apparent that the evaporator 136 will be sufficiently cooled before the ice formed by operation of evaporator 112 begins to affect the bulb 192 to an extent which will cause the switch 190 to open. Under normal conditions, this will assure that chamber 176 and its contents will remain well below 32° F. until the bulb 192 has risen to a temperature which causes the switch 190 to reclose, starting a new cycle which first cools the evaporator 136 and then cools the evaporator 112. A proper distribution of insulation and of materials capable of storing heat in latent or specific form will assure that in normal ambient temperatures the chamber 176 will be held well below freezing with chamber 172 always somewhat above freezing under control of the switch 190 and its bulb 192, even without the aid of the valve mechanism.

Figure 3:
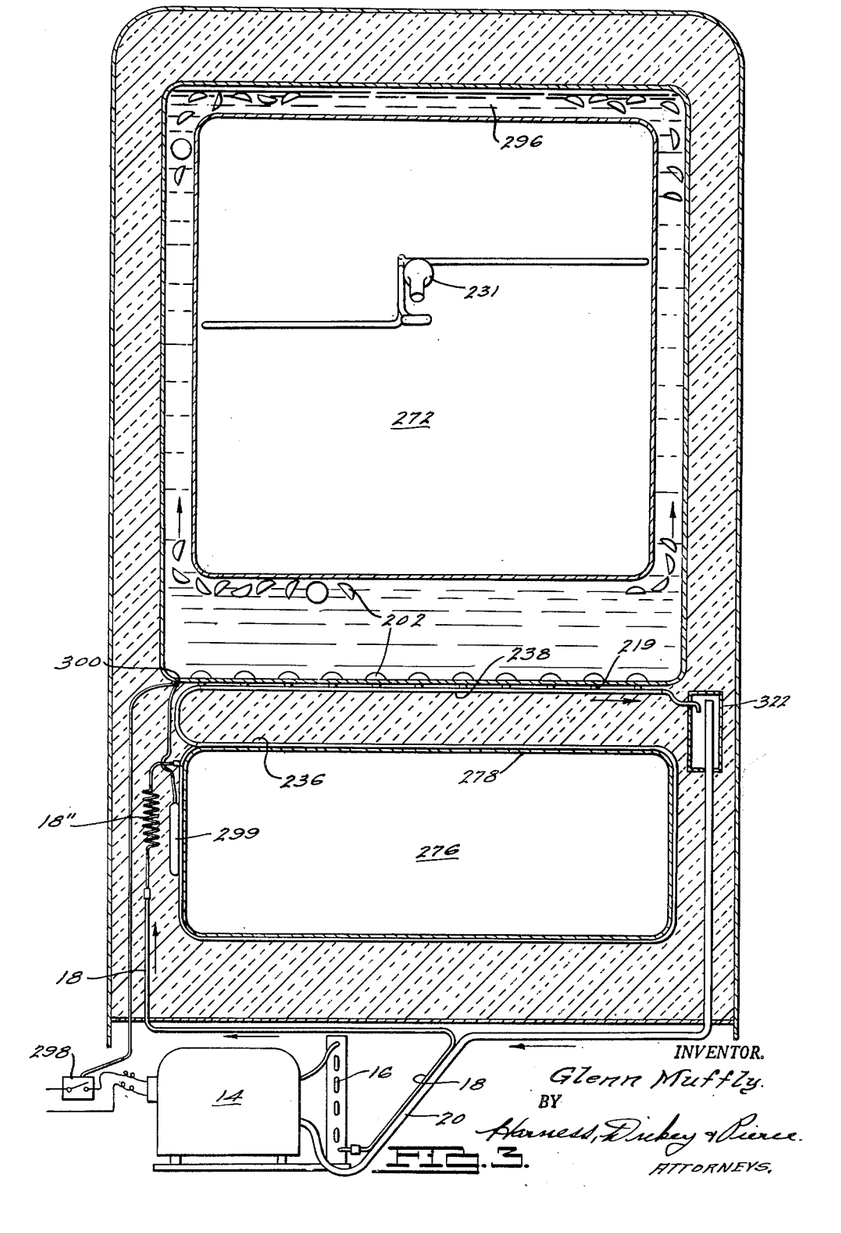
Figure 3 shows a front sectional view of a cabinet and system in which the freezer is located below the main food space and the upper, warmer space is cooled by ice which floats upwardly into a water jacket surrounding the liner of the main food space. This corresponds to the arrangement "C" mentioned above.

The method of operation last described above will allow location of the freezer below the main food space, as seen in Figure 3. Where the evaporator 236 cools the freezer and evaporator 238 makes ice to cool the main food space 272, these evaporators being connected in series. Evaporator 236 is spirally wound around freezer liner 278 instead of having headers as seen in Figure 2, thus being lower in cost. Either can be used in either design.

The freezer space 276 is cooled by its liner 278 with which the coil 236 is in good thermal contact and the main food space 272 is cooled by the ice and water in tank 296 which surrounds the food space 272 on five sides.

The thermostatic switch 298 controls the motor-compressor unit 14 in response to temperature changes of bulb 299 in contact with liner 278 and the connecting tube portion 300 which contacts tank 296 near one of the ice-making areas associated with evaporator 238.

Refrigerant flows first through coil 236 and then through coil 238 to a conventional accumulator 322 with which suction tube 20 is connected. The tube 20 is in heat exchange with liquid tube 18 ahead of the restrictor 18'' as in previous views.

A water faucet 231 is connected with that portion of tank 296 located behind the space 272 and projects forward as in the case of faucet 231 in Figure 2.

Operation of motor-compressor unit 14 is normally controlled by temperature changes of tube 300 to make and release ice in tank 296 as before explained, but in case the liner 278 of the freezer space 276 warms up to say +10° F. the liquid which fills bulb 299 expands, pushing liquid beyond the tube section 300 to a warmer part of the tube farther removed from the ice-making areas at the bottom of tank 296 and thus hastens the starting of unit 14. It is thus seen that while the motor-compressor operation is normally controlled by temperature changes of tube 300 it will when required start in response to a temperature rise of liner 278 sufficient to expand the liquid in bulb 299 without evaporating it therein but thereby pushing the liquid-vapor contact area in tube 300 to a warmer zone somewhat farther removed from an ice-making area, thus creating a higher pressure on switch 298 to cause it to close.

Figures 4, 7:
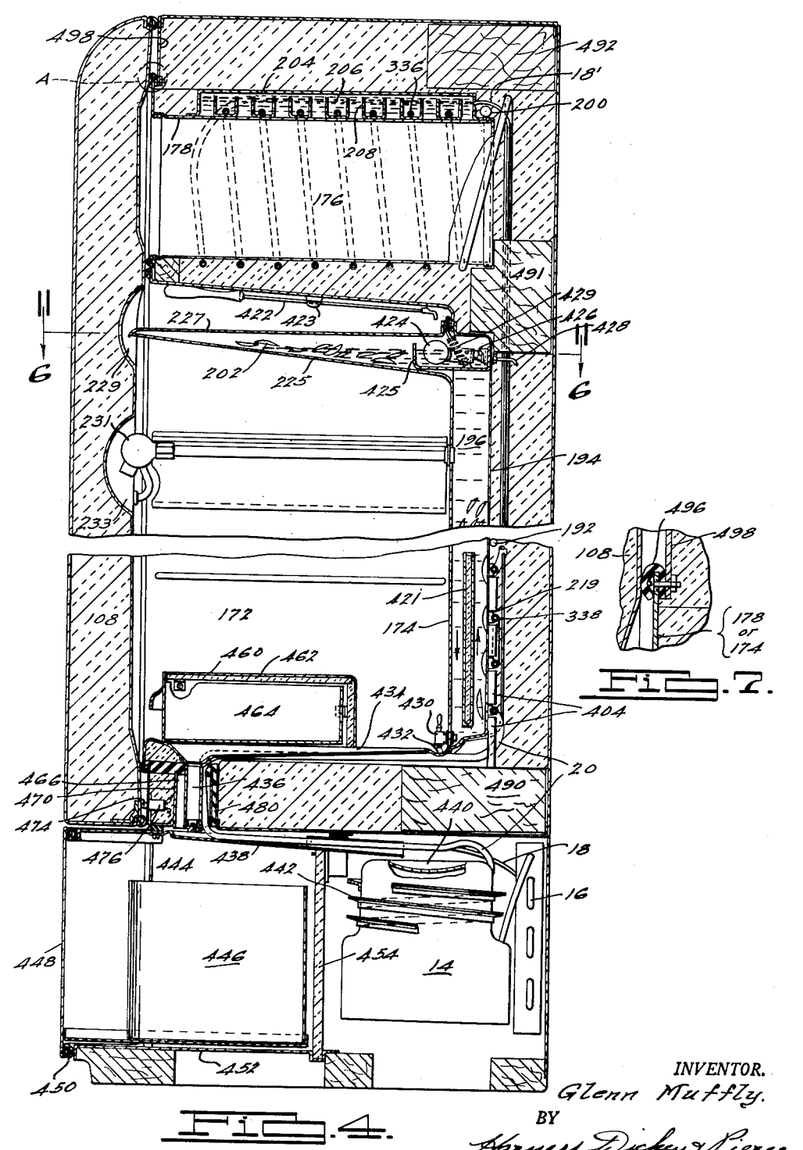
Figure 4 is a vertical sectional view showing a cabinet and system similar in arrangement to Figure 2 but similar in operation to Figure 3, and showing some details which are omitted in but applicable to Figures 1, 2 and 3. This corresponds to arrangement "B" above.
Figure 7 is an enlargement of the portion A marked by broken circle in Figure 4.

Figure 4, like Figure 3, shows the vapor-lock tube 18' (corresponding to 18'' of Figure 3) leading directly from the condenser to the freezer evaporator 336 (corresponding to 236 in Figure 3). These two evaporators are shown as formed by one continuous tube in each of the two figures, with refrigerant going first to the freezer evaporator. The unit 14 of Figure 4 may be controlled by a thermostatic switch similar to switch 298 of Figure 3. Generically the system of Figure 4 operates as does the system of Figure 3.

The baffle 421 as shown in Figure 4 as a metal-covered slab of insulating material instead of the plain sheet of metal 221 seen in Figure 2. The insulation of this baffle is to minimize heat transfer between the warmer water located between the baffle and the liner 174 and the colder water located between the baffle and the refrigerated side of the tank which is contacted by buttons or raised portions of the evaporator 338. The warmer water is heavier than the colder water in this case because both are within the range of reverse thermal expansion of water.

Another detail shown in Figure 4 which does not appear in the previous figures is the rake 422 which is removably secured to the top of liner 174 by means of the spring clip 423. This rake is so located that the cover 227 can be raised and the rake then withdrawn from the spring clip for use in removing the floating ice 202 from the chute 225.

Another detail shown here and assumed to be employed in the other figures where not shown is the float 424 and the shield 425 which protects it from floating ice. This float is removably pivoted to the shield 425 so that in response to a drop of water level it pushes against and opens the valve 426. This valve is preferably of the type employing insides such as are used in automobile tires but with a male threaded stem, this combination being generally known as a "tank valve." The valve stem is screwed into a fitting which connects with the water supply tube 428 which passes through the insulation remote from refrigerated surfaces and is connected with the city water supply. The spring 429 has no connection with the valve action but acts to hold the cover 227 open when it is lifted. As the cover is closed, this spring moves over center so that it acts to aid in holding the cover closed or at least comes near enough to its dead center position to exert a negligible effect in opening the cover 227. In the event that the cover is left open when the door 108 is closed the forward downwardly turned tip of the cover is struck by the liner of the door at the upper portion of the clearance pocket 229 and this pushes the cover downwardly far enough to cause it to fall by gravity to its closed position.

The water tank is provided with a drain or flush valve 430 at its bottom. When this valve is opened, water flows into the gutter 432 which extends around three sides of the liner bottom and into the gutter 434 which drains from 432 for the purpose of carrying condensate which collects on the liner 174 into the drain tube 436. This drain tube extends downwardly through an opening in the insulated bottom wall of the space 172. The water thereupon flows through a trap at the lower end of the tube 436 into the outside gutter 438 which carries the drip water toward the rear of the cabinet and deposits it in the cupped top 440 of the motor-compressor unit 14. This unit may be equipped with external fins 442 welded to its outer casing in spiral form as shown in Figure 4. Since this casing is normally warm, the drip water is evaporated as fast as it collects and ordinarily there will not be any overflow from the cup 440 onto the fins 442 which form a spiral trough for distributing the excess condensate over the warm outer wall of the unit 14. In front of the compartment which encloses the unit 14 and the condenser 16, there is a space 444 for reception of drawer 446 which has a front 448 carrying a gasket 450 to insure reasonable air tightness of the space 444. This space is further enclosed by the metal bottom 452 and the insulated wall 454. This wall need not be heavily insulated as it is desired to allow some of the heat from the unit 14 to reach the space 444 so that the air in this space is warmer than the room in which the refrigerator is located.

Above the drain 436 and at the left side of the main food space 172 there is a small enclosure formed by the housing 460 which may have an insulating lining 462. This housing encloses the drawer 464 which is designed for the storage of butter in particular and optionally for other foods to be kept at a slightly higher temperature than that which prevails in the space 172. This drawer is not only protected from the cooling effect of the refrigerating system by being enclosed but is slightly warmed by air circulation between its housing and the tube 436. This tube passes downwardly through an annular air space 466 which is open to the warm compartment 444. The warmer air in the space 444 rises into the space 466 thus warming the tube 436 and the air within it. At the same time the tube 436 cools the air in the space 466 thus condensing moisture from it to drip into the trough 438 and there join condensate which has been drained from the inside of the refrigerator through the tube 436 and the trap at its bottom end. The result of this is dehydration of the space 444 so that products stored in the drawer 446 are not only kept at slightly above room temperature but in air considerably dryer than room air. This drawer is intended for the storage of breakfast foods, crackers and other food products which do not require refrigeration but should be kept dry.

Figure 5:
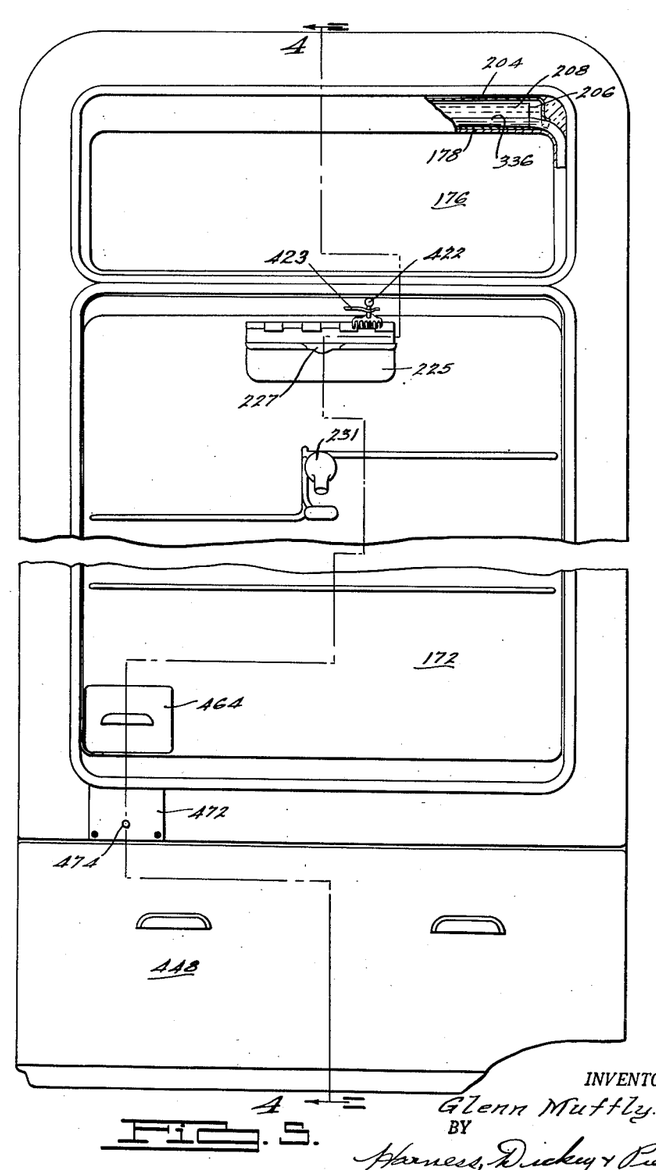
Figure 5 is a front elevation, partly in section, of Figure 4, with the door removed.

A metal sleeve 470 surrounds space 466 and is embedded in a block of insulating material removable through a gap covered by the removable plate 472 which is seen in Figure 5. The button 474 which passes through this plate is associated with the switch 476 which is connected to a lamp for illumination of the interior of the cabinet in the customary manner. The sleeve 470 and the filler block between it and the plate 472 are partially surrounded by the gasket or the insulating material 480 so that attachment of the plate 472 to the cabinet compresses this gasket and insures an air-tight joint.

It will also be noted that the liquid tube 18 and the suction tube 20 pass through the annular space 466 and are surrounded by a suitable gasket at the top of this space to prevent air leakage into the insulation or into the space between the insulation and the cabinet liner. The tube 20 is located above or within the trough 438 so that any condensation on the tube drips into the trough. The liquid tube 18 is in heat exchange with the suction tube 20 which minimizes the collection of condensate upon the tube 20.

The two liners 174 and 178 together with their associated parts including the drain tube and filler block above mentioned are removable through the front of the cabinet thus making it possible to remove the entire system from the cabinet by opening the door, removing the drawer 446, removing the wall 454 and loosening the plate 472 together with minor parts and the disconnection of electrical wires. This allows for complete assembly and test of the system before it is installed in the cabinet and for removal of the system for servicing it.

In order to allow for the use of an efficient insulation which normally means a soft insulating material and yet avoid use of metallic structural members joining the liners with the outer shell of the cabinet, I have provided the blocks 490, 491 and 492 which are preferably made of balsa wood or similar material having good insulating qualities and a fair degree of compressional strength. These blocks need not displace any great amount of the softer and more efficient insulating material but will serve to hold the liners 172 and 176 in place after assembly to the cabinet. Smaller pieces of material on the order of that used for the above mentioned blocks form spacers 404 which serve to hold the evaporator 338 in place so that its buttons or contact areas which touch the outer wall of the tank 196 will not shift from their desired positions.

Figure 5 is a front view of Figure 4 with a few of the parts identified to aid in reading the drawing.

Figure 6:
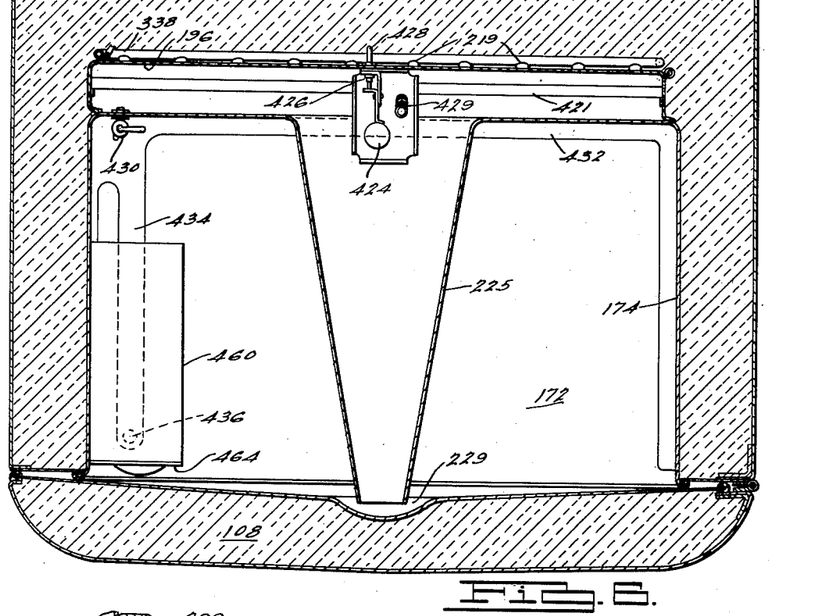
Figure 6 is a horizontal section of Figure 4 on the line 6—6 thereof.

Figure 6 is a sectional view of Figure 4 taken on the line 6—6 thereof.

Figure 7 shows an enlarged detail of the area identified by a dotted circle and the character A in Figure 4. This shows how the gasket 496 seals the breaker frame 498 to the outwardly turned flange of the liner 178 or 174. It will be seen that this gasket not only seals the flange of 178 to the breaker frame 498 but also forms a compressible gasket between the cabinet body and the door 108. This gasket per se is not claimed as new since such a gasket is shown in my own issued Patent No. 1,801,564 but its use here is distinctive in providing for the removal of the liners 172 and 178 from the cabinet without disturbing the breaker frame 498. For the purpose of such removal, the screws which clamp the liner flanges to the breaker frame 498 are removed by lifting the outer portion of the gasket to allow access to the screw heads. These screws are threaded into tapped or sheet metal nut strips permanently attached to the back of the breaker frame 498.

Preferably a portion of the soft insulation located between the two liners 174 and 178 will be removed with the liners while the block 491 may remain in the cabinet shell or remove with the liners as desired. In order to provide for ready removal of the tank assembly from the cabinet, the top of the eutectic tank 204 should be lower than the edge of the breaker frame 498 at the point where it must pass. Other details of this nature will be readily apparent to the designer.

The ice-water tank may in any of these views be formed as shown, using the back of the liner of the main food space as one side of the tank, or the tank may be made complete in itself and located next to the liner so that the tank itself forms the liner or a portion of it. In this case the evaporator which cools the ice-water tank at spots is to be protected from contact with the air in the main food space.

In Figure 3 the evaporator sections 236 and 238 may be considered as one evaporator coil wound first around the liner 278 and then in hairpin bends across the bottom of the tank 296 with suitable buttons 219 for making the ice forming contacts with the outer wall of tank 296.

Referring again to Figure 4 and the use of flush valve 430, it is planned to make the drain trough 438 and the trap in the bottom of tube 436 removable so that water drained from the tank 196 does not flow onto the motor-compressor unit 14 but can be caught in a bucket or pan placed within the space 444 for which purpose the drawer 446 is removed.

Since this patent application is not concerned with the design of the condenser 16, I have shown this condenser in conventional form as a finned coil without indicating whether there is a fan for circulating air over it or some means for producing gravity circulation of air. It will be understood that suitable means is to be provided for producing the required air circulation.

The dividing wall 454 seen in Figure 4 is to be fairly close fitting but easily removable so that access may be had to the condensing unit and the thermostatic control by removing the drawer 446 and the wall 454.

While Figures 4, 5, 6 and 7 show a cabinet construction quite similar to that of Figures 1 and 2, the system and its control are more like that of Figure 3 because the two evaporators are connected in series to operate at substantially the same pressure instead of being separated by valves as in Figures 1 and 2. When the freezer is located below the main food space as shown in Figure 3, the two evaporators can obviously be made of one continuous coil and, therefore, considered as a single evaporator. In Figure 4 and other views of it shown by Figures 5, 6 and 7, the evaporator may also be one continuous coil and referred to as an expansion coil having one portion arranged in contact with the wall 194 of tank 196 while another portion of the same coil is wound around the liner 178 of the freezer space. It is obvious that a control suitable for Figure 3 could also be used in Figure 4 of which Figures 5, 6 and 7 are details.

On the other hand if we consider cabinet construction and arrangement of the automatic ice maker, Figures 1, 2 and 4 are interchangeable as to the various details shown.

In connection with the dehydration of compartment 444 and disposal of drip water reference is made to my copending application Serial No. 616,523 filed September 15, 1945, now Patent No. 2,563,811, July 31, 1951, which discloses an arrangement of this type.

In Figure 4 it will be seen that the spirally wrapped coil 336 rises to a higher level than the balance of the coil before continuing downwardly to the evaporator 338. This is for the purpose of trapping liquid in the coil 336 during idle periods of the motor-compressor unit 14.

During such periods any liquid refrigerant remaining in the ice making coil 338 will evaporate therein and the vapor will flow to the coil 336 where it will be condensed in the upper portion of this coil by giving up its latent heat of vaporization to the cryohydrate or frozen eutectic solution 206. Except for that part of the refrigerant absorbed in the oil in the unit 14 and the low pressure vapor remaining in other parts of the system the entire refrigerant charge will be confined to the coil 336 which now serves as a secondary system wherein refrigerant vapor is condensed in the upper horizontal legs of the coil in heat exchange with the holdover material 206, liquid flowing into the side and bottom legs of this coil where it evaporates to cool the liner 178 and the vapor returns to that part of the coil confined within the tank 204 to be recondensed.

The effect of two bulbs connected with one thermostat to respond to temperature changes of two zones which are held at quite different temperatures as mentioned in connection with Figure 3 is similar to the method disclosed in my U. S. Patent No. 2,359,780 which issued October 10, 1944, but I have made some improvements on this type of control since that time. These improvements are illustrated by Figures 8 and 9.

Figures 8, 9:
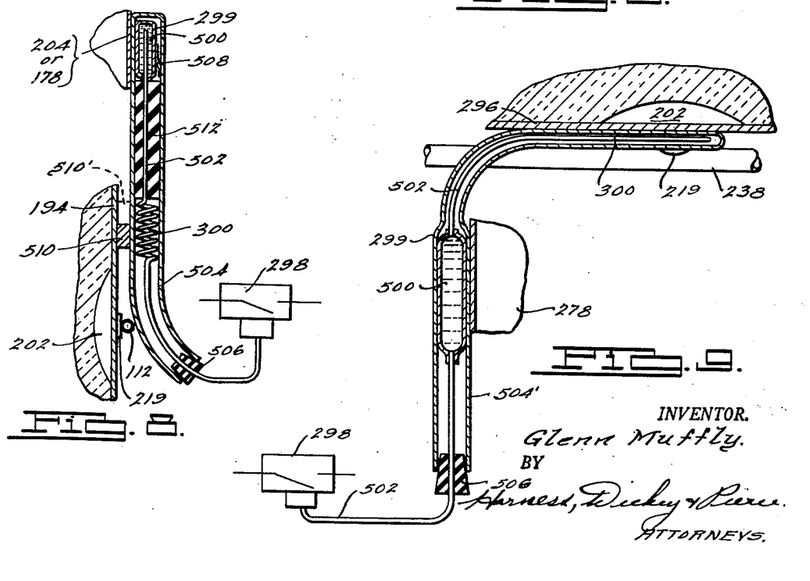
Figures 8 and 9 are enlarged details of Figs. 4 and 3 respectively, showing combined liquid expansion and vapor charged bulbs connected with one switch, as in my U. S. Patent No. 2,359,780, but arranged for easy removal from the cabinet.

Figure 8 illustrates a control bulb arrangement suitable for use in connection with the evaporator arrangements shown by Figures 1, 2 and 4 where the colder evaporator is located above the warmer one which is here illustrated as the coil 112 used for making ice. The colder zone is indicated at the top of Figure 8 as the tank 204 of freezing solution or liner 178 of the freezing compartment.

The thermostatic switch 298 has connected with it the bulb 299 and a section of tubing 300, the latter being arranged in heat exchange with the tank 194 in which ice discs 202 are being formed by conductivity of heat through the contact buttons 219 to the evaporator tube 112. The bulb 299 is completely filled with a volatile fluid 500 in its liquid phase. A smaller quantity of this same liquid is located within the tube portion 300 which is here shown coiled in spiral form for convenience. Other parts of this tube which form the connections are identified by the numeral 502. The tube 502 and the expansible chamber within 298 are filled with vapor only of the same fluid since the temperatures of these parts are always higher than the temperature of the portion 300 and this portion is always warmer than the bulb 299.

Normally there will be a small portion of the volatile liquid in the tube 502 at the section 300 while the bulb 299 is entirely filled with liquid because of being located in thermal relationship with the freezer. Both portions are located within a metal tube 504 which is closed at its upper end and open at a point outside of the insulated wall of the refrigerator at its lower end, this lower end being closable by means of the plug 506 which has a bore and is split to receive the tube 502.

Within the upper end of the tube 504 is a spring 508 which urges the bulb 299 against that side of the tube 504 which is in contact with the freezing zone represented by 204 or 278. Thermal contact between the tube 504 and the wall 194 is provided by means of the movable member 510 which is preferably formed of copper, aluminum or other good thermal conducting material to provide heat exchange between the tube 504 and the wall 194 at a selected area. This area is shiftable by movement of the block 510 between its shown position and the position 510'. This adjustment may be effected by the member 217 as seen in Figure 2.

Between the bulb 299 and the tube portion 300, a rubber sleeve 512 surrounds the tube 502. This sleeve may be made of any material having some thermal insulating value and not being too soft. It is split longitudinally for assembly to the tube 502 and serves to prevent buckling of this tube when the bulb 299 is pushed to the top of the tube 504 and particularly as the bulb 299 engages the spring 508 which is fixed to the tube 504.

The control 298, bulb 299 and tube 502 including its thermally sensitive portion 300 are one assembly charged with a proper weight of volatile fluid. To this assembly the split sleeve 512 and the stopper 506 are added and the bulb 299 is then pushed up as far as it will go in the tube 504. This locates the tube portion 300 at approximately the proper level which can be checked by measurement through the open end of the tube 504 prior to inserting the plug 506 into it. The upper end of tube 502 is shown extending to nearly the top of bulb 299 but this is not necessary because the diameter of the tube 502 is small enough so that liquid and vapor cannot pass each other within the tube. When the freezer has been cooled to within its desired temperature limits, the bulb 299 will be of such a temperature that most of the volatile fluid will be condensed therein, filling the bulb 299 completely with liquid and leaving enough liquid over to partially fill the upper end of the tube 502 within and adjacent to the bulb 299.

In addition to this there will be a small amount of liquid left at the next coldest section of the enclosure which will be at the portion 300. In normal operation the switch 298 responds to temperature changes of the section 300 where a slight amount of liquid is condensed adjacent to the block 510. In the event that the freezer as represented by 178 or 204 rises above its desired temperature range, the liquid contained within the bulb 299 will expand thermally without evaporating. This expansion forces some of the liquid into the tube 502 whereupon more liquid collects within the portion 300 until some part of this liquid extends beyond the zone which is cooled by contact with the block 510. The vapor pressure effective upon the switch 298 will be that of vapor in contact with this additional liquid which has by evaporation and condensation migrated from the bulb 299 to the warmer portion 300.

Figure 9 shows this double bulb arrangement as adapted for use in connection with a system wherein the freezer is located at a lower level or nearer the outside wall of the cabinet than the warmer zone, as in Figure 3. Liquid fills the bulb 299 which is now located midway in the length of the tube 502. The section 300 which responds to temperature fluctuations of the warmer zone need not be coiled so is shown straight in Figure 9. The tube 504' corresponds to the tube 504. In both of these figures, the warmer zone is represented by an automatic ice maker of the flotation type but it will be understood that this control arrangement is not limited to use in that connection. The evaporator coils 112 or 238 could be used for direct cooling of air or the portion 300 might be responsive to air temperature so far as the operation of this control is concerned.

The arrangement shown, whereby the main food space is cooled almost entirely by ice-water in a jacket-like tank, is preferred because it provides for maintaining a very high relative humidity in the main food space 72, 172 or 272 without danger of reversal of the temperature difference between the cooling surfaces and the cooled surfaces of dishes and foods stored in this space. In the high-humidity household refrigerators now on the market there are serious complaints about the excess deposit of dew on foods and dishes. This results from the fluctuations of temperatures of the surfaces which cool the air.

Air cooled by a 32° surface and circulating in the box at 35° will have a relative humidity of about 90%, hence will not deposit moisture on foods held at 35°. If during idle periods of the system the cooling surface warms up to 37°, as is quite common for an intermittently cooled liner, the air circulating over the foods will start absorbing water vapor from the wet 37° surface and depositing it on the 35° surfaces of foods and dishes.

In order to have a constant high humidity in the main food space, it is not only necessary that the cooling surface be held at 32° F. or above but it is necessary to be sure that the cooling surface never reaches a temperature higher than that of the dishes stored in this space. The transfer of moisture from foods to the cooling surface is held to a very small amount by having very little temperature difference between them, but when this temperature difference is reversed the foods pick up not only the moisture they previously lost but some of the much greater amount of moisture condensed from the room air which enters the refrigerator when the door is open. This is the reason for food damage by excessive moisture in high humidity refrigeration.

Such reverse transfer of moisture to the foods is prevented by the ice-water jacket arrangement and the thermal separation of evaporators from the main food space.

What I claim is:

1. In a refrigerating system, a refrigerant condensing means, two evaporators arranged to receive liquid refrigerant from said condensing means and to operate a first one within higher and a second one within lower temperature limits, a substance in heat exchange with one of said evaporators having the characteristic of passing through a change of state within the operating temperature range of the last said evaporator, a valve mechanism connected in said system for the purpose of diverting the flow of refrigerant caused by said condenser means, and a temperature responsive element in heat exchange with said substance, said element being connected to actuate said valve mechanism when said substance is cooled to a temperature below its freezing point, whereby refrigerant flow between said condensing means and the last said evaporator is substantially stopped and said condensing means is caused to operate mainly in effecting the cooling of the other of said evaporators.

2. A refrigerating system including a plurality of evaporators, a frigerator cabinet including separate spaces each cooled by one of said evaporators, an ice-maker tank adapted to contain ice and water and having a wall area arranged to cool one of said spaces, one of said evaporators being located outside of the space it cools, isolated from it and in heat transfer externally with a wall of said tank, a control device regulating the last said evaporator to cause it to stop operation after freezing a portion only of the water in said tank, whereby the ice and water in the tank forms a heat transfer medium to conduct heat from the last said space to the last said evaporator and also serves as a latent heat capacity barrier between the last said evaporator and the last said space to prevent the freezing of products stored in said space and to supply cooling effect to said space during idle periods of the last said evaporator.

3. In a refrigerating system employing a charge of volatile refrigerant, a first evaporator comprising a main portion and an accumulator, thermal insulation interposed between said accumulator and said main portion, a second evaporator, a port and conduit means connecting said accumulator with the first said evaporator, a second port and conduit means connecting said accumulator with said second evaporator, and valve means for closing the first said port and opening the second said port to trap some of said refrigerant charge in said main portion and allow another part of said charge to circulate through said second evaporator and evaporate therein.

4. In a refrigerating system, a refrigerant condensing apparatus, a pair of evaporators, a pair of thermally separated spaces each one of which is cooled by one of said evaporators, a container for liquid in heat exchange with one of said evaporators and with the space cooled thereby, said liquid being adapted to be frozen by said evaporator, a control device including valve means actuated in response to the freezing of said liquid to divert refrigerant flow and thereby stop flow through the evaporator associated with said liquid and start operation of the other of said evaporators, and means responsive to a temperature change produced by said other evaporator for controlling the operation of said condensing apparatus.

5. In a refrigerating system, a pair of evaporators connected in parallel, a single liquid-control device serving as the sole means of pressure reduction for each of said evaporators, a single accumulator connected with the outlets of both said evaporators, valve means connected between said liquid-control device and the evaporators for the purpose of stopping the flow of liquid into either of said evaporators one at a time, and a check valve located between the outlet of one of said evaporators and the accumulator.

6. In a refrigerating system employing a charge of volatile refrigerant, a condensing unit, two evaporators, fluid conduits connecting said evaporators with said condensing unit for flow of said refrigerant therethrough, valve means arranged to close off a first portion of the internal volume of one of said evaporators from the balance of said system and thereby trap a liquid portion of said refrigerant charge in said first portion, conduit means for transferring refrigerant from a second portion of said internal volume to the other of said evaporators for use in cooling said other evaporator, and apparatus for controlling the application of energy to said valve means in response to temperature changes.

7. In a refrigerating system, refrigerant condensing apparatus, a low temperature evaporator, a higher temperature evaporator, control means causing said condensing apparatus to act during a part only of its operating time on one of said evaporators, and latent heat storage means in heat exchange with an upper portion of said one of the evaporators, the last said evaporator being formed to provide an ascending passage for vapor and a descending passage for liquid between a lower portion of the evaporator and said upper portion thereof, whereby this evaporator when not being actively cooled by the operation of said condensing apparatus will operate as a secondary evaporative refrigerating system of which said upper portion serves as the condenser cooled by said latent heat storage means and said lower portion acts as the evaporator portion of said secondary system with substantially the same vapor pressure in each of said portions.

8. In a refrigerating system, a charge of volatile refrigerant, a condensing unit for circulating said refrigerant, a low temperature evaporator including an accumulator through which refrigerant is free to recirculate while said evaporator is operating under the effect of said condensing unit, said evaporator having sufficient total internal volume to contain substantially all of the refrigerant in said system which is in its liquid phase while said evaporator is active under the influence of said condensing unit, a second evaporator adapted to operate at a higher temperature than said low temperature evaporator, refrigerant conduits and ports connecting said accumulator with the balance of said low temperature evaporator and with said higher temperature evaporator, valves arranged to open and close said ports, and temperature responsive means for actuating said valves to stop flow of liquid refrigerant from said accumulator to the balance of said low temperature evaporator and open a port for flow of liquid refrigerant from said accumulator to said higher temperature evaporator, whereby the latter evaporator is supplied with refrigerant and thereby caused to become active.

9. In a refrigerator, a storage space, a second storage space, a refrigerating system including evaporator means comprising three sections, one of said sections being arranged to cool the first said space to a sub-freezing temperature, a second one of said sections being arranged to cool the second said space to a higher temperature, conduits connecting the third one of said sections with each of said one and second sections, a valve mechanism for intermittently stopping flow of refrigerant between said one and third sections, and a thermally responsive control for regulating the application of energy to actuate said valve mechanism.

10. In a refrigerator, a food storage space, insulation surrounding said space, a water tank located between the insulation and said space, an evaporator including a section located between said tank and insulation and having a plurality of thermal contacts with a wall of said tank, and a control for regulating the cyclic operation of said evaporator to cause ice to be frozen within said tank in separate masses on a plurality of separate wall areas thereof which are cooled by said thermal contacts and then released to float away from said areas and accumulate near the top of said tank, said tank and its contents providing a main portion of the cooling effect for said space.

11. In a refrigerating system a condensing unit for condensing a refrigerant, a pair of evaporators adapted to operate within separate ranges of pressure and thereby be cooled to higher and lower temperatures respectively by the evaporation of said refrigerant, a single header connected with both said evaporators and adapted to serve as a header portion of either of said evaporators for recirculation of refrigerant in either of them according to which of said evaporators is receiving liquid refrigerant from said condensing unit, a valve mechanism controlling refrigerant flow from said header to said evaporators to feed one of them at a time with liquid refrigerant and thereby cause said condensing unit to draw refrigerant vapor from said evaporators one at a time, a valve for stopping the flow of refrigerant vapor from said header to the colder of said evaporators when said condensing unit is operating to cool the warmer of said evaporators, and a thermally responsive source of energy for actuating said valve mechanism.

12. In a refrigerating system employing a charge of volatile refrigerant, a condensing apparatus, first and second evaporators, said first evaporator comprising first and second sections connected by conduit means, a valve mechanism arranged to stop refrigerant flow between said sections and thereby trap a liquid portion of said refrigerant in said first section, conduit means for flow of refrigerant from said second section to said second evaporator, a valve operable to open and close the last said conduit means, and a source of energy for actuating said valve mechanism and said valve to cause liquid refrigerant to be trapped in said first section and to open the second said conduit means whereby refrigerant is allowed to flow from said second section to said second evaporator, thus causing said second evaporator to become active while less than the total refrigerant charge is being circulated by said condensing apparatus.

13. In a refrigerating system employing a charge of volatile refrigerant, a condensing apparatus, first and second evaporators, said first evaporator comprising first and second sections connected by conduit means, a valve mechanism arranged to stop refrigerant flow between said sections and thereby trap a liquid portion of said refrigerant in said first section, conduit means for flow of refrigerant between said second section and said second evaporator, a valve operable to control the last said conduit means, and a source of energy for actuating said valve mechanism and said valve to cause some of the liquid portion of the refrigerant to be trapped in said first section and to open the valve in the second said conduit means whereby liquid refrigerant is drained from said second section to said second evaporator to cause said second evaporator to become active while less than the total refrigerant charge is being circulated by said condensing apparatus.

14. In a refrigerating system, a plurality of evaporator sections, condensing apparatus arranged to supply volatile liquid refrigerant to and remove vaporized refrigerant from said evaporator sections, cyclically actuated valves for closing off one of said sections from the balance of the system and trapping in said one section a portion of said refrigerant which is partly in its liquid phase, and heat storage means in heat exchange with a portion of said one of said sections for causing condensation of refrigerant vapor in said portion and thereby evaporation of liquid refrigerant in a second portion of said one section while said portion of the refrigerant is trapped in said one section.

15. In a refrigerating system employing a volatile refrigerant, a condensing apparatus, an evaporator arranged to operate at a relatively high evaporating temperature, an evaporator arranged to operate at a relatively low evaporating temperature, wall means enclosing a chamber at all times openly connected with said higher temperature evaporator and cyclically connected with said lower temperature evaporator, a single pressure reducing device for regulating the flow of liquid refrigerant through a constant path to said chamber, and valve means for diverting the flow of refrigerant so as to cause liquid to flow from said chamber to one or the other of said evaporators with substantially no further reduction of pressure after it has passed through said pressure reducing device, thereby causing said evaporators to be cooled one at a time by the operation of said condensing apparatus.

16. In a refrigerating system employing a charge of volatile refrigerant, an evaporator operating at a relatively high evaporating pressure, an evaporator operating at a relatively low evaporating pressure, a single pressure reducing device comprising the only one through which refrigerant liquid for either evaporator flows in the same manner and direction, selective means for shifting the flow of liquid refrigerant after leaving said device to cause it to enter one or the other of said evaporators, and latent heat storage means fixedly associated with an upper portion of said lower pressure evaporator whereby said upper portion is cooled to serve as the condenser of a secondary refrigerating system when refrigerant vapor is not being removed from said evaporator.

17. In a refrigerating system employing a charge of volatile refrigerant, a condensing apparatus, an evaporator located at a higher level, an evaporator located at a lower level, a valve mechanism for dividing the internal volume of the first said evaporator into two portions, and an additional valve for draining liquid refrigerant from one of said portions into the evaporator located at the lower level, said valves acting to shift the action of said condensing apparatus from operating the first said evaporator to operating the second said evaporator.

18. In a refrigerating system employing a volatile refrigerant, a pair of evaporators operable respectively at high and low evaporating temperatures and pressures, thermally actuated valves for modifying the course of refrigerant flow in said system to cause one of said evaporators to operate while the other is idle, said valves acting in one set of positions to trap a portion of said refrigerant in both liquid and vapor phase in said lower temperature evaporator at a lower pressure than the operating pressure of said higher temperature evaporator while only said higher temperature evaporator is operating and acting in a second set of positions to direct refrigerant flow through said lower temperature evaporator and to cause said higher temperature evaporator to remain dry with only stagnant refrigerant vapor in it at the operating pressure of said lower temperature evaporator while only said lower temperature evaporator is operating.

19. In a refrigerating system, a refrigerant condensing unit, a pair of evaporators operatively connected with said condensing unit, and heat storage means in heat exchange with a portion only of one of said evaporators, said heat storage means acting to cool said portion and thereby cause it to act as the condenser of a secondary refrigerating system of the evaporative uniform pressure type while said condensing means is not acting to cool the last said evaporator and another portion of the last said evaporator is acting as the evaporator of said secondary system.

20. In a refrigerating system employing a volatile refrigerant, refrigerant condensing apparatus, a pair of evaporators adapted to be operated one at a time by said condensing apparatus and within separate temperature ranges, a container of freezable material in heat exchange with one of said evaporators to provide cooling effect during idle periods of said one evaporator, control means responsive to a condition of said freezable material to alter the path of refrigerant flow in said system and thereby stop refrigerant flow through one of said evaporators and simultaneously start flow through the other of said evaporators, and control means responsive to temperature changes associated with said other evaporator to regulate the operation of said condensing apparatus.

GLENN MUFFLY.

References Cited in the file of this patent

UNITED STATES PATENTS

| Number | Name | Date |
|---|---|---|
| 1,382,837 | Jurek | June 28, 1921 |
| 1,494,688 | Joachim | May 20, 1924 |
| 1,601,445 | Hilger | Sept. 28, 1926 |
| 1,990,663 | Muffly | Feb. 12, 1935 |
| 2,095,010 | Philipp | Oct. 5, 1937 |
| 2,105,460 | Gaugler | Jan. 11, 1938 |
| 2,133,962 | Shoemaker | Oct. 25, 1938 |
| 2,133,963 | McCloy | Oct. 25, 1938 |
| 2,146,797 | Dasher | Feb. 14, 1939 |
| 2,191,925 | Kaufman | Feb. 27, 1940 |
| 2,289,728 | Rees | July 14, 1942 |
| 2,345,714 | Phillip | Apr. 4, 1944 |
| 2,359,780 | Muffly | Oct. 10, 1944 |
| 2,375,319 | Muffly | May 8, 1945 |
| 2,425,634 | Muffly | Aug. 12, 1947 |
| 2,428,312 | Herbener | Sept. 30, 1947 |